US012645298B2

(12) United States Patent
Dong et al.

(10) Patent No.: US 12,645,298 B2
(45) Date of Patent: Jun. 2, 2026

(54) APPARATUS

(71) Applicant: Lenovo (Beijing) Limited, Beijing (CN)

(72) Inventors: Fangfei Dong, Beijing (CN); Ruyuan Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/165,531

(22) Filed: Feb. 7, 2023

(65) Prior Publication Data

US 2023/0251717 A1 Aug. 10, 2023

(30) Foreign Application Priority Data

Feb. 7, 2022 (CN) .......................... 202210115903.9

(51) Int. Cl.
*G06F 3/01* (2006.01)
*G06F 3/02* (2006.01)
*G06F 3/0354* (2013.01)
*G06F 3/041* (2006.01)

(52) U.S. Cl.
CPC ............ *G06F 3/016* (2013.01); *G06F 3/0221* (2013.01); *G06F 3/03545* (2013.01); *G06F 3/041* (2013.01)

(58) Field of Classification Search
CPC .... G06F 3/016; G06F 3/0221; G06F 3/03545; G06F 3/041; G06F 3/03547; G06F 1/1666; G06F 1/1669
See application file for complete search history.

(56) References Cited

U.S. PATENT DOCUMENTS

| | | | | | |
|---|---|---|---|---|---|
| 6,265,993 | B1 * | 7/2001 | Johnson | ................ | G06F 3/0221 |
| | | | | | 345/157 |
| 2003/0227396 | A1 * | 12/2003 | Chen | ..................... | G06F 3/0221 |
| | | | | | 345/168 |
| 2004/0130526 | A1 * | 7/2004 | Rosenberg | .............. | G06F 3/021 |
| | | | | | 345/156 |
| 2008/0303782 | A1 * | 12/2008 | Grant | ..................... | G06F 3/016 |
| | | | | | 345/173 |
| 2010/0238119 | A1 * | 9/2010 | Dubrovsky | ........... | G06F 1/1626 |
| | | | | | 345/169 |
| 2011/0227822 | A1 * | 9/2011 | Shai | ...................... | G06F 1/1656 |
| | | | | | 345/156 |
| 2011/0260976 | A1 * | 10/2011 | Larsen | ............... | G06F 3/04886 |
| | | | | | 345/168 |
| 2011/0305493 | A1 * | 12/2011 | Wu | ...................... | G06F 3/0221 |
| | | | | | 400/472 |

(Continued)

FOREIGN PATENT DOCUMENTS

CN 104182054 A * 12/2014

*Primary Examiner* — Temesghen Ghebretinsae
*Assistant Examiner* — Sosina Abebe
(74) *Attorney, Agent, or Firm* — ANOVA LAW GROUP, PLLC

(57) ABSTRACT

An apparatus includes a function assembly, a haptic assembly, and a first connector. The function assembly is configured to provide a first function. The haptic assembly is configured to provide a second function and has a folded posture and an unfolded posture. The first connector is arranged at a first end of the haptic assembly and configured to fix the haptic assembly in the unfolded posture on an input surface of an input device. The second function is different from the first function. The second function is a haptic function.

18 Claims, 7 Drawing Sheets

(56) References Cited

U.S. PATENT DOCUMENTS

| | | | |
|---|---|---|---|
| 2014/0160025 A1* | 6/2014 | Natarajan | G06F 3/0412 |
| | | | 345/168 |
| 2014/0356044 A1* | 12/2014 | Shen | B43K 29/00 |
| | | | 401/195 |
| 2015/0153777 A1* | 6/2015 | Liu | G06F 1/1643 |
| | | | 345/173 |
| 2015/0220118 A1* | 8/2015 | Kwak | G09G 5/373 |
| | | | 345/520 |
| 2017/0060183 A1* | 3/2017 | Zhang | H10K 59/87 |
| 2017/0154609 A1* | 6/2017 | Yoon | G09G 5/373 |
| 2018/0074607 A1* | 3/2018 | Zhang | H04W 4/60 |
| 2018/0210560 A1* | 7/2018 | Xia | H05K 1/028 |
| 2018/0275770 A1* | 9/2018 | Kang | G06F 3/0488 |
| 2018/0284964 A1* | 10/2018 | Kang | H04M 1/0268 |
| 2019/0369670 A1* | 12/2019 | Cho | G06F 1/1656 |
| 2020/0110471 A1* | 4/2020 | Platt | G06F 3/0393 |
| 2020/0159293 A1* | 5/2020 | Seibert | G06F 1/1618 |
| 2022/0236768 A1* | 7/2022 | Browning | G06F 1/1622 |
| 2022/0291800 A1* | 9/2022 | Hong | G06F 3/0442 |

* cited by examiner

APPARATUS

CROSS-REFERENCE TO RELATED APPLICATION

This application claims priority to Chinese Patent Application No. 202210115903.9, filed on Feb. 7, 2022, the entire content of which is incorporated herein by reference.

TECHNICAL FIELD

The present disclosure relates to an apparatus.

BACKGROUND

An apparatus is widely used. However, the current apparatus has a single function and poor adaptability.

SUMMARY

Embodiments of the present disclosure provide an apparatus, including a function assembly, a haptic assembly, and a first connector. The function assembly is configured to provide a first function. The haptic assembly is configured to provide a second function and has a folded posture and an unfolded posture. The first connector is arranged at a first end of the haptic assembly and configured to fix the haptic assembly in the unfolded posture on an input surface of an input device. The second function is different from the first function. The second function is a haptic function.

Figure 1:
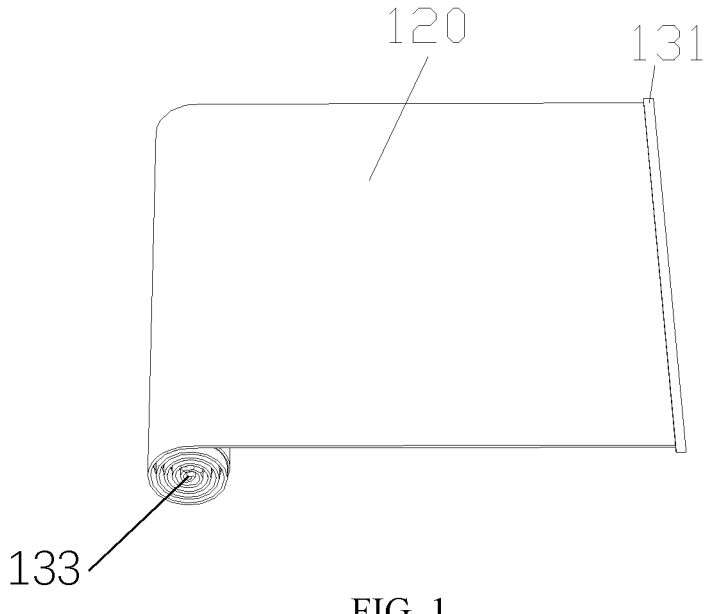
FIG. 1 illustrates a schematic local structural diagram of an apparatus according to embodiments of the present disclosure.

| | | |
|---|---|---|
| 100 First body | 120 Haptic assembly | 121 Protrusion |
| 131 First connector | 132 Second connector | 140 Input device |
| 150 Display input | 200 Second body | 210 Display assembly |

-continued

| | |
|---|---|
| assembly | |
| 300 Third body | |

DETAILED DESCRIPTION OF THE EMBODIMENTS

The technical solution of the present disclosure is further described in detail below in connection with the accompanying drawings and specific embodiments.

In the description of embodiments of the present disclosure, unless otherwise stated and limited, the term "connection" should be understood in a broad sense. For example, the connection can include an electrical connection or an internal communication of two elements and can be a direct connection, or an indirect connection through an intermediate medium. Those of ordinary skill in the art can understand specific meanings of the above term according to specific situations.

The term "first\second\third" involved in embodiments of the present disclosure is only used to distinguish similar objects and does not represent a specific order of the objects. Understandably, "first\second\third" can be interchanged for a specific order or sequence when allowed. The objects distinguished by "first\second\third" can be interchanged under appropriate situations. Thus, embodiments of the present disclosure described herein can be implemented in sequences other than those illustrated or described herein.

An apparatus of embodiments of the present disclosure is described in detail below with reference to FIG. 1 to FIG. 10.

The apparatus (e.g., apparatus 10) includes a function assembly (e.g., function assembly 110), a haptic assembly 120, and a first connector 131. The function assembly can be configured to provide a first function. The haptic assembly 120 can be configured to provide a second function. The haptic assembly 120 can have a folded posture and an unfolded posture. The first connector 131 can be arranged at the first end of the haptic assembly 120. The first connector 131 can be configured to fix the haptic assembly 120 in the unfolded posture to an input surface of an input device 140. The second function can be different from the first function. The second function can be a haptic function. The apparatus can have the first function through the function assembly. The apparatus can have the second function through the haptic assembly. Thus, the apparatus can have the first function and the second function to greatly improve the adaptability of the apparatus.

In embodiments of the present disclosure, a structure of the apparatus is not limited. For example, the apparatus can include an electronic apparatus. Thus, the apparatus can have an electrical function assembly. For example, the apparatus can be a computer or a cellphone. For another example, the apparatus can be a stylus for a computer or cellphone. The function assembly can have a detection function.

For another example, the apparatus may not be an electronic apparatus. The apparatus can have a mechanical function assembly, or a function assembly that is passively related to an electronic apparatus. For example, the apparatus can be a stylus for a computer or cellphone. The apparatus can be an input device or an accessory apparatus. The function assembly can have a to-be-detected function. For another example, the apparatus can be a support apparatus, and the function assembly can have a support function. For example, the apparatus can support the functions of the computer or cellphone.

In embodiments of the present disclosure, the haptic assembly 120 can be configured to provide a haptic function for the input device 140. Thus, the tactility of the input device 140 can be improved through the haptic assembly 120, and the user experience of the input device 140 can be improved.

The manner in which the haptic assembly 120 provides the haptic function is not limited.

Figure 2:
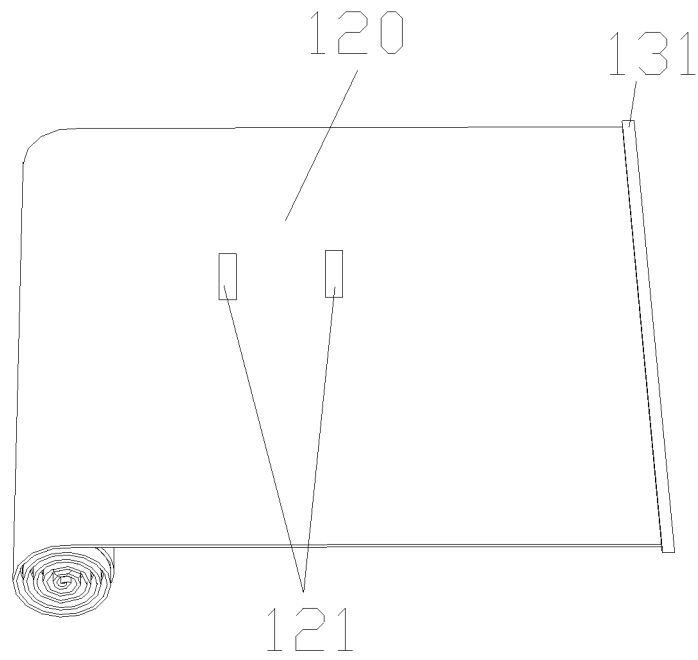
FIG. 2 illustrates a schematic local structural diagram of an apparatus according to embodiments of the present disclosure.

For example, the haptic assembly 120 can include a protrusion 121. The protrusion 121 can be configured to provide a haptic positioning function. The protrusion 121 can or cannot have a deformation function. In some embodiments, as shown in FIG. 2, the protrusion 121 does not have the deformation function. When the haptic assembly 120 is in the unfolded posture and fixed on the input surface of the input device 140, a user can know a position relative to the input device 140 through the protrusion 121. In some embodiments, the protrusion 121 can be similar to protrusion structures arranged at keys F and J of the keyboard.

Figure 3:
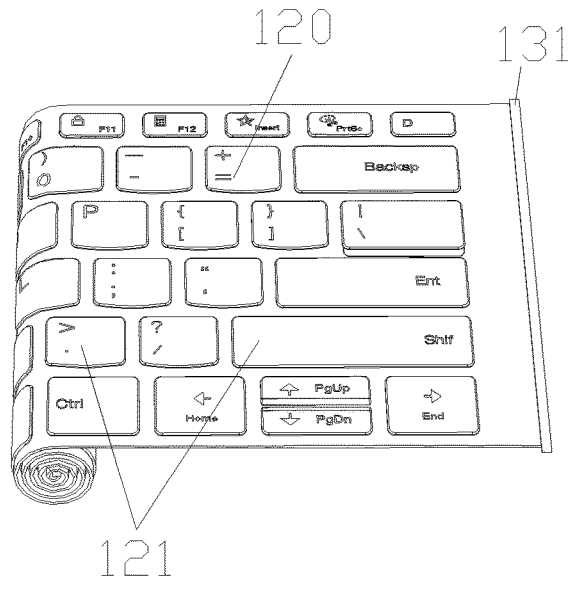
FIG. 3 illustrates a schematic local structural diagram of an apparatus according to embodiments of the present disclosure.

In some other embodiments, as shown in FIG. 3, the protrusion 121 has the deformation function. When the haptic assembly 120 is in the unfolded posture and fixed on the input surface of the input device 140, the user can know the position relative to the input device 140 through the protrusion 121, and the protrusion 121 can deform to provide an input stroke. In some embodiments, the protrusion 121 is similar to a protruded keycap of a key structure in FIG. 3.

In some other embodiments, the haptic assembly 120 can have the deformation function. Thus, the haptic assembly 120 can provide an input stroke for the input device 140 through the deformation function to improve the user experience of the input device 140. For example, when the haptic assembly 120 is fixed on the input surface of the input device 140 in the unfolded posture, a portion of the haptic assembly 120 can move in a direction perpendicular to the input surface with an external force. When the external force is removed, the portion of the haptic assembly 120 can return to an original position of the haptic assembly 120. Thus, when the user taps the haptic assembly 120, the user can feel a position change to improve the user experience of the input device 140.

In some embodiments, the manner in which the haptic assembly 120 deforms is not limited. For example, as shown in FIG. 1, the haptic assembly 120 is in a flat plate structure in the unfolded posture. A material of the haptic assembly 120 can be a deformable material. The haptic assembly 120 can realize deformation through the material of the haptic assembly 120. For another example, as shown in FIG. 3, the haptic assembly 120 includes a flat structure and a protrusion 121. The protrusion 121 can be deformable relative to the flat structure. The protrusion 121 can deform through the material or the structure. In some embodiments, the protrusion 121 can be formed by stamping a first portion on a substrate of a flat plate to cause the first portion to protrude from the substrate. Thus, the protrusion 121 can deform through the structure and the material.

In some embodiments, the material of the haptic assembly 120 is not limited. For example, the material of the haptic assembly 120 can be rubber. For example, the haptic assembly 120 can have a rubber film structure.

In embodiments of the present disclosure, the structure of the input device 140 is not limited, and the input device 140 can have an input function.

In some embodiments, the input device 140 can have a third function different from the haptic function of the haptic assembly 120. For example, the input surface of the input device 140 can be a rigid surface, and the input surface cannot be deformed. The input surface may not be provided with an indication structure capable of determining a position through haptic sensing. In some embodiments, the input device 140 can have an input function. The input device can input characters. The input device can be similar to a virtual keyboard. The input device 140 can be a haptic input board or a haptic input screen. The haptic assembly 120 can have the haptic function. With the haptic assembly 120, the haptic experience of the input device for inputting the characters can be improved. The haptic assembly 120 may not have the input function corresponding to the haptic input board or the haptic input screen.

In embodiments of the present disclosure, the manner in which the haptic assembly 120 has the folded posture is not limited. For example, the haptic assembly 120 can be in a storage state by being located in another structural member or occupying a smaller area. For example, the haptic assembly 120 can have the folded posture by being folded or curled.

The manner in which the haptic assembly 120 has the unfolded posture is not limited. For example, the haptic assembly 120 can be in the unfolded posture by being located outside another structure or occupying a larger area. For example, the haptic assembly 120 can be in the unfolded posture by being flattened to form a flat structure.

In embodiments of the present disclosure, the structure of the function assembly is not limited, as long as the function assembly can provide the first function. The first function cannot be the haptic function. The first function can be also different from the function of the input device 140. In some embodiments, when the apparatus is an electronic apparatus, the function assembly can be a function assembly having a processing function in the electronic apparatus. In some embodiments, the function assembly can be a processor. For another example, when the apparatus is a stylus, the function assembly can have a detection function or a to-be-detected function.

In embodiments of the present disclosure, the structure of the first connector 131 is not limited. For example, the first connector 131 can be a rod-shaped structure, or a plate-shaped structure.

In some embodiments, the first connector 131 can be fixedly connected to the first end of the haptic assembly 120.

In some embodiments, the manner of using the first connector 131 to fix the haptic assembly 120 in the unfolded position onto the input surface of the input device 140 is not limited.

For example, the first connector 131 can have an adsorption function. The first connector 131 can be connected to another structure through the adsorption function to cause the haptic assembly 120 in the unfolded posture to be fixed on the input surface of the input device 140. For example, the first connector can have a magnetic adsorption function. For another example, the first connector can have a adsorption plate. The first connector can have an adsorption force due to a difference between the atmospheric pressures inside and outside.

For another example, the first connector 131 can have a first snap member. The first connector 131 can be coupled to a second snap member of another structure through the first snap member to cause the haptic assembly 120 in the unfolded posture to be fixed on the input surface of the input device 140. In some embodiments, the first snap member can be a hook. The second snap member can be a slot. The hook can be locked in the slot.

In embodiments of the present disclosure, the apparatus can further include a first body 100. The first body 100 can be connected to a second end of the haptic assembly 120. At least a part of the haptic assembly 120 can be stored in the first body 100 to be in the folded posture. The at least a part of the haptic assembly 120 can be located outside of the first body 100 to be in the unfolded posture. The haptic assembly 120 can be stored through the first body 100 to prevent the haptic assembly 120 from being damaged.

In embodiments of the present disclosure, the apparatus can be stored outside the first body 100. Then, the haptic assembly 120 can be in a folded state or a curled state.

In some embodiments, the structure of the first body 100 is not limited. For example, the first body 100 can have a rod-shaped structure or a plate-shaped structure.

In embodiments of the present disclosure, the manner in which the haptic assembly 120 is stored in the first body 100 is not limited.

For example, the apparatus can further include a reset assembly. The reset assembly can be arranged at the first body 100. The reset assembly can be connected to the second end of the haptic assembly 120. The reset assembly can be configured to cause the haptic assembly 120 in the unfolded pasture to be stored in the first body 100.

In embodiments of the present disclosure, the structure of the reset assembly is not limited.

In some embodiments, the reset assembly can include a spring. A first end of the spring can be connected to the first body 100, and a second end of the spring can be connected to the second end of the haptic assembly 120. When the first connector 131 is connected to another structure, the spring can provide a pull force for the second end of the haptic assembly 120 through a deformation force. The first connector 131 can provide a pull force for the first end of the haptic assembly 120 by being connected to the another structure. Thus, the haptic assembly 120 in the unfolded posture can be fixed on the input surface of the input device 140. When the first connector 131 is disconnected from the another structure, the spring can provide a pull force for the second end of the haptic assembly 120 through the deformation force to cause the haptic assembly 120 to move into the first body 100. The spring can be a tension spring or a coil spring.

In some other embodiments, the reset assembly can also include a drive mechanism. The second end of the haptic assembly 120 can be driven by the drive mechanism to move into the first body 100.

In some other embodiments of the present disclosure, the apparatus can cause the haptic assembly 120 in the unfolded posture to be stored at the outside of the first body 100 through the reset assembly. Thus, the haptic assembly 120 can be in the folded state or the curled state.

In some embodiments, the first body 100 can include the input device 140, a first accommodation chamber, and a first opening. The input device 140 can be configured to collect an input operation and generate an input signal. The first accommodation chamber can be configured to store the haptic assembly 120 in the folded posture. The first opening can be located on a first side of the first body 100. The first opening can be configured for the haptic assembly 120 located in the first accommodation chamber to move out of the first accommodation chamber through the first opening. Thus, the haptic assembly 120 can be stored in the first body 100 and can provide the haptic function for the input device 140.

In some embodiments, the apparatus can be an electronic apparatus. The apparatus can have a function of collecting the input operation and generating an input signal through the input device 140. The apparatus can have a third function different from the input device 140 and the haptic assembly 120 through the function assembly. The third function can be a processing function or a display function.

In some embodiments, the structure of the first body 100 is not limited. For example, the first body 100 can have a plate-shaped structure.

In some embodiments, the haptic assembly 120 can move out of the first body 100 through the first opening, or partially move out of the first body 100 through the first opening.

Figure 4:
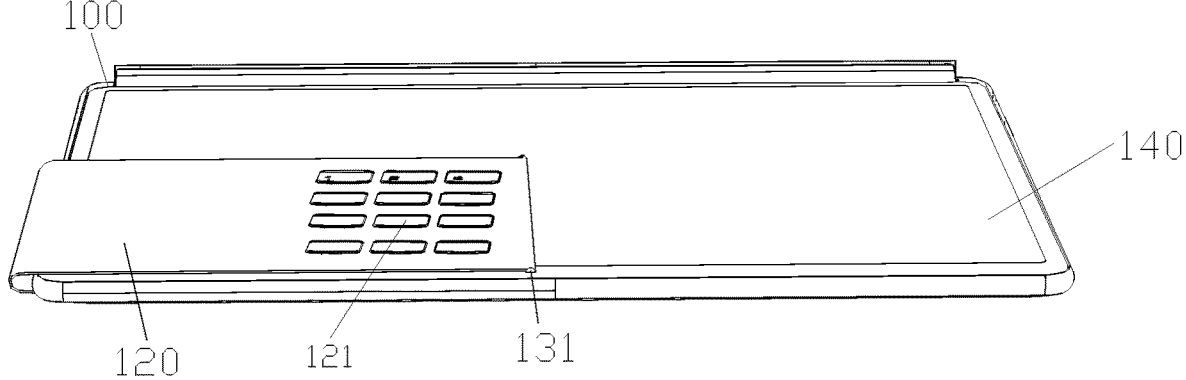
FIG. 4 illustrates a schematic structural diagram of an apparatus according to embodiments of the present disclosure.

For example, as shown in FIG. 4, a part of the haptic assembly 120 moves out of the first body 100 through the first opening.

In some embodiments, the first connector can have the adsorption plate. The adsorption plate can be connected to the surface of the input device 140 by adsorption.

In some embodiments, the part of the haptic assembly 120 that moves out of the first opening can provide the haptic function for the input device 140. For example, as shown in FIG. 4, numbers are able to be input at the part of the input device covered by the haptic assembly 120. The haptic assembly 120 has a protrusion. Numbers that are identical to the input numbers of the input device can be marked at the protrusion. Thus, the protrusion of the haptic assembly 120 can provide the haptic experience of the input process for the input numbers of the input device.

In some embodiments, as shown in FIG. 4, the first opening is located on a left side of the first body 100. In some other embodiments, the first opening can be located on a right side of the first body 100.

Figure 5:
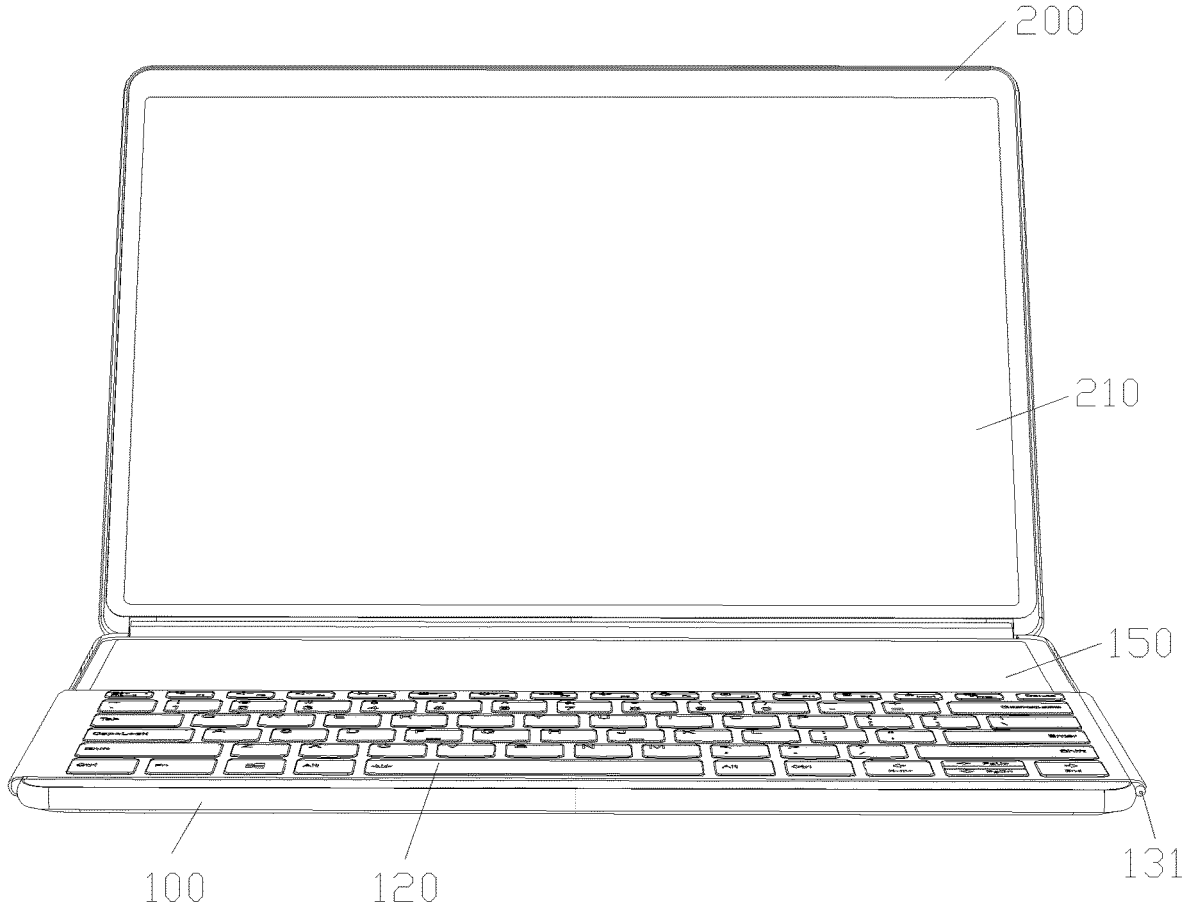
FIG. 5 illustrates a schematic structural diagram of an apparatus according to embodiments of the present disclosure.
Figure 6:
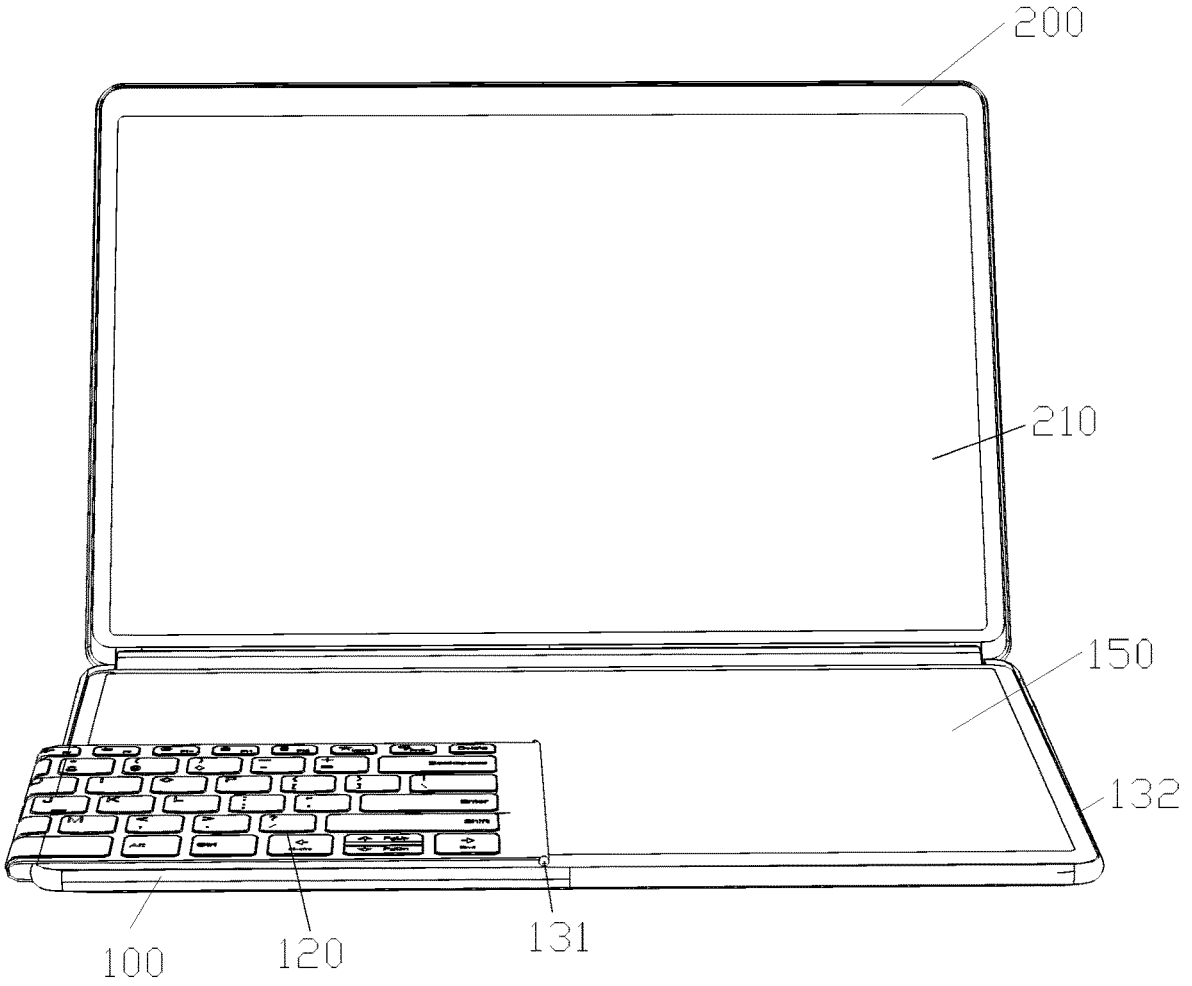
FIG. 6 illustrates a schematic structural diagram of an apparatus according to embodiments of the present disclosure.

In some other embodiments, as shown in FIG. 5 and FIG. 6, the first body further includes a second connector 132. The second connector 132 can be arranged on the second side of the first body 100. The second connector 132 can be configured to be connected to the first connector 131. The second side of the first body 100 and the first side of the first body 100 are located on opposite sides of the input device 140. Thus, the haptic assembly 120 can pass through the first opening to move out of the first body 100.

In some embodiments, the second side of the first body 100 and the first side of the first body 100 can be located on opposite sides of the input device 140. Thus, the haptic assembly 120 that moves from the first opening to the outside of the first accommodation chamber can directly be in the unfolded posture and fixed on the input surface of the input device 140.

In some embodiments, the structure of the second connector 132 is not limited, as long as the second connector 132 can be connected to the first connector 131. For example, the first connector 131 can include a first adsorption member, and the second connector 132 can include a second adsorption member. The first adsorption member and the second adsorption member can be connected by an adsorption force. The adsorption force can be a magnetic adsorption force or a vacuum adsorption force. For another example, the first connector 131 can have a first snap member, and the second connector 132 can have a second snap member. The first snap member and the second snap member can be snapped and connected. For example, the first snap member can be a first hook, the second snap member can be a second slot, and the first hook can be locked in the second slot.

In some embodiments, the first body 100 can also include a third connector 133 on the first side. The third connector 133 can be connected to the first connector 131 to cause the haptic assembly 120 to be stored in the first accommodation chamber. By connecting the third connector 133 to the first connector 131, the haptic assembly 120 can be prevented from being pulled to the outside of the first body 100 due to an error operation. Thus, the first connector 131 can cause the haptic assembly 120 in the unfolded posture to be fixed on the input surface of the input device 140 and cause the haptic assembly 120 to be stably stored in the first accommodation chamber.

A structure of the third connector 133 is not limited, as long as the third connector 133 can be connected to the first connector 131. The third connector 133 and the second connector can be the connectors of the same type. In some embodiments, the first connector 131 can include the first adsorption member, the third connector 133 can include a third adsorption member. The first adsorption member and the third adsorption member can be connected by a suction force. The adsorption force can be the magnetic adsorption force or the vacuum adsorption force. In some other embodiments, the first connector 131 can include the first snap member, the third connector 133 can include a third snap member, and the first snap member and the third snap member can be snapped and connected. For example, the first snap member can be the first hook, the third snap member can be a third slot, and the first hook can be locked in the third slot.

In some embodiments, the first body can further include a second opening. The second opening can be located on the second side of the first body. The second opening can be configured for the haptic assembly located in the first accommodation chamber to pass through the second opening to move to the outside of the first accommodation chamber. The second side of the first body and the first side of the first body can be located on opposite sides of the input device. Thus, the haptic assembly can move out of the first body through the first opening and move out of the first body through the second opening.

In some embodiments, the haptic assembly can be only a structural member or two structural members.

In some embodiments, the haptic assembly can include the two structural members. The haptic assembly can include a first haptic member and a second haptic member. The first haptic member can be stored in the first accommodation chamber through the first opening. The first haptic member can move to the outside of the first body through the first opening. The second haptic member can be stored in the first accommodation chamber through the second opening. The second haptic member can move to the outside of the first body through the second opening. The first haptic member and the second haptic member can move to the outside of the first body to be neighboring to each other. Thus, the first haptic member and the second haptic member can be similar as in one structural member. Sizes of the first haptic member and the second haptic member are not limited. For example, the first haptic member can have a first width, the second haptic member can have a second width, and the first width can be greater than the second width. In some embodiments, the first width can be ⅔ of the width of the input device, and the second width can be ⅓ of the width of the input device. The width can refer to a length formed between the second side of the first body and the first side of the first body. The first haptic member can include a first protrusion. The first protrusion can be marked with letters. The first protrusion can include marks similar to a letter keyboard. The second haptic member can include a second protrusion. The second protrusion can be marked with numbers. The second protrusion can include marks similar to a number keyboard. Thus, by inputting the letters of the input device, the first haptic member can provide the haptic experience for the inputting process. By inputting the numbers of the input device, the second haptic member can provide the haptic experience for the inputting process. Meanwhile, since the first haptic member and the second haptic member are two structural members, both the first haptic member and the second haptic member can provide the haptic experience, or one of the first haptic member and the second haptic member can provide the haptic experience. Thus, the haptic assembly can be flexibly used. The first connector can be connected to an end of the first haptic member. A seventh connector can be arranged at an end of the second haptic member. The seventh connector can have a structure similar to the first connector. In some embodiments, the first connector can include the first adsorption plate, and the seventh connector can include a second adsorption plate.

In some other embodiments, the haptic assembly can be one structural member. A first part of the haptic assembly and a second part of the haptic assembly can move to the outside of the first body through the first opening in sequence, and the second part of the haptic assembly and the first part of the haptic assembly can move to the outside of the first body through the second opening in sequence. Sizes of the first part of the haptic assembly and the second part of the haptic assembly are not limited. For example, the first part of the haptic assembly can have a third width, the second part of the haptic assembly can have a fourth width, and the third width can be greater than the fourth width. In some embodiments, the third width can be ⅔ of the width of the input device. The fourth width can be ⅓ of the width of the input device. The width can refer to the length formed between the second side of the first body and the first side of the first body. The first part of the haptic assembly can include a third protrusion. The third protrusion can be marked with a letter. The third protrusion can include a mark similar to the letter keyboard. The second part of the haptic assembly can include a fourth protrusion. The fourth protrusion can be marked with a number. The fourth protrusion can include a mark similar to the number keyboard. Thus, the first part of the haptic assembly can be configured to provide the haptic experience of an input process for inputting the letter of the input device, and the second part of the haptic assembly can be configured to provide the haptic experience of an input process for inputting the number of the input device. Meanwhile, since the first part of the haptic assembly and the second part of the haptic assembly can be one structural member. Thus, the first part of the haptic assembly and the second part of the haptic assembly can provide the haptic experience simultaneously. The first part of the haptic assembly and the second part of the haptic assembly can move to the outside of the first body from the first opening and also from the second opening. In some embodiments, the first part of the haptic assembly and the second part of the haptic assembly can provide the haptic experience separately. Thus, the first part of the haptic assembly can move to the outside of the first body from the first opening, or the second part of the haptic assembly can move to the outside of the first body from the second opening. The first connector can be connected to an end of the first part of the haptic assembly. An eighth connector can be arranged at an end of the second part of the haptic assembly. The eighth connector can have a structure similar to the first connector. In some embodiments, the first connector can include the first adsorption plate, and the eighth connector can include a third adsorption plate.

In some embodiments, as shown in FIG. 5 and FIG. 6, the apparatus further includes a second body 200. The second body 200 can be rotatably connected to the first body 100. The apparatus can be an electronic apparatus such as a laptop.

The input device 140 can be a touchpad arranged at the first body 100.

In some embodiments, the apparatus further includes a display input assembly 150. The display input assembly 150 can be arranged at the first body 100. At least a part of the display input assembly 150 can form the input device 140. In some embodiments, a whole or a part of the display input assembly 150 can form the input device 140. The display input assembly 150 can include a touch screen.

In some embodiments, the apparatus further includes a display assembly 210. The display assembly can be arranged at the second body 200. A structure of the display assembly 210 is not limited. For example, the display assembly 210 can only have a display function. In some other embodiments, the display assembly 210 can also have the display function and the haptic function. Thus, the display input assembly can be a first display input assembly, and the display assembly can be a second display input assembly. In some embodiments, the display assembly 210 and the display input assembly 150 can have separate structures. The display assembly 210 may or may not have the haptic function. In some embodiments, the display assembly 210 and the display input assembly 150 can have an integrated structure. The display assembly 210 can have the haptic function. The display assembly 210 and the display input assembly 150 can bend at a connection position. For example, the display assembly 210 and the display input assembly 150 can be an integrated flexible display input assembly.

Figure 7:
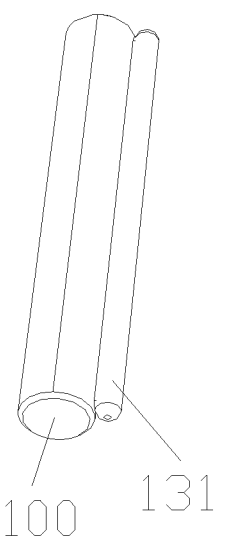
FIG. 7 illustrates a schematic structural diagram of an apparatus according to embodiments of the present disclosure.
Figure 8:
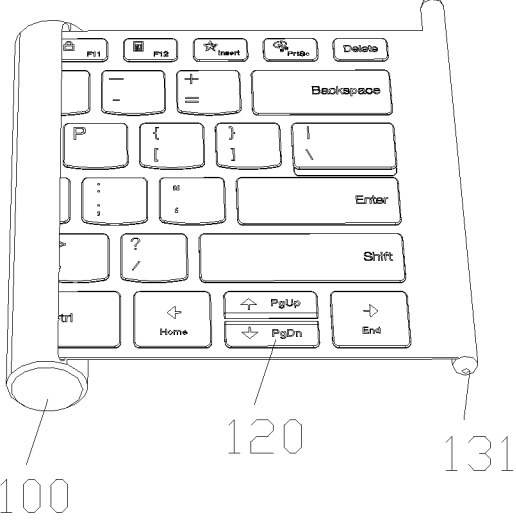
FIG. 8 illustrates a schematic structural diagram of an apparatus according to embodiments of the present disclosure.

In some embodiments, as shown in FIG. 7 and FIG. 8, the first body 100 includes an input member. When the input member and the input device 140 satisfy a distance relationship, the input device 140 can detect a position of the input member relative to the input surface. Thus, an input operation can be performed on the input device 140 through the input member of the first body 100.

In some embodiments, the apparatus can be an apparatus similar to a stylus. The function assembly can be the input member. The input member can have a detection function or a to-be-detected function.

In some embodiments, the first body 100 can be arranged outside of another electronic apparatus. The first body 100 can have a function of internally storing the haptic assembly 120. Thus, the first body 100 can have a larger cross-section than a structure that does not have the function of internally storing the haptic assembly 120. The first body 100 can be thicker and easier to hold, which can greatly improve holding experience of the first body 100.

In some other embodiments of the present disclosure, the haptic assembly 120 can also be stored outside the first body 100. Thus, the haptic assembly 120 can also increase the cross-section of the first body 100 to further improve the holding experience of the first body 100. Meanwhile, since the haptic assembly 120 has the haptic function, the touch feeling of holding the first body 100 can be increased through the haptic assembly 100 to further improve the user experience of the first body 100. For example, the haptic assembly 120 can be arranged outside of the first body 100 in a curled manner.

In some embodiments, the first body 100 can be a strip-shaped structure or a column-shaped structure.

Figure 9:
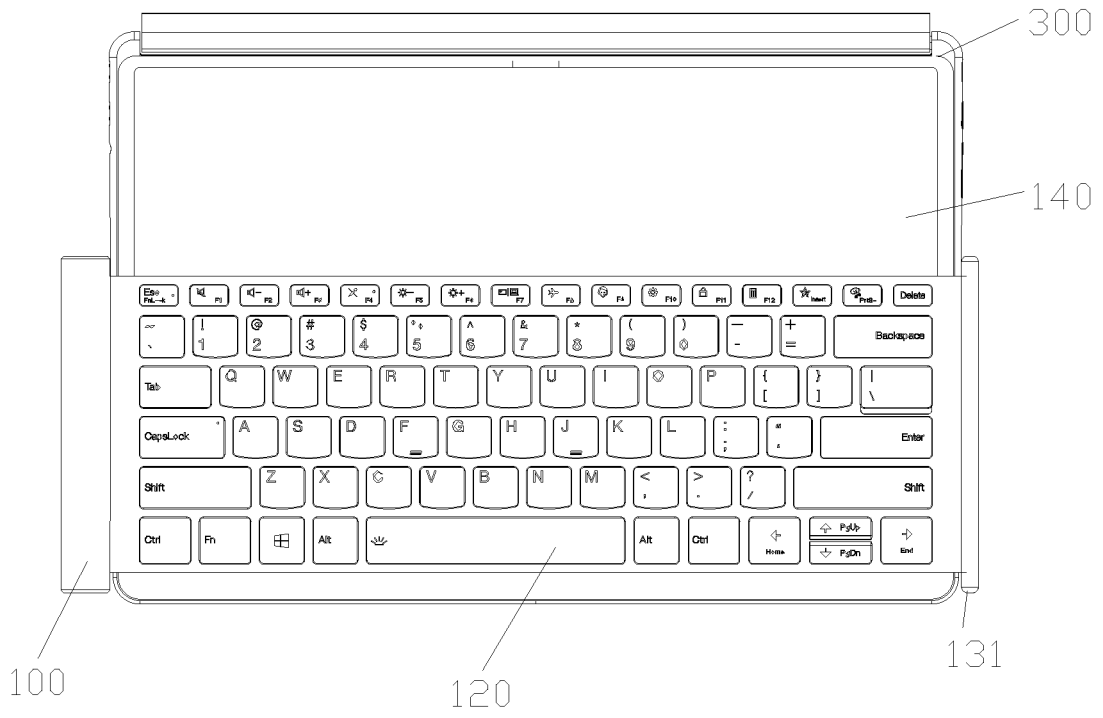
FIG. 9 illustrates a schematic structural diagram of an apparatus according to embodiments of the present disclosure.
Figure 10:
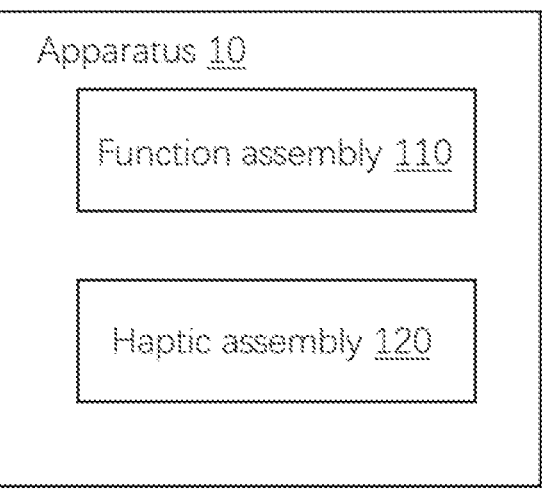
FIG. 10 illustrates a schematic diagram of an apparatus according to embodiments of the present disclosure.

In some embodiments, as shown in FIG. 9, the apparatus further includes a third body 300. The third body 300 includes the input device 140. The first body 100 can be detachably arranged on a side of the third body 300 or inside the third body 300. Thus, the first body 100 can provide an input operation for the input device 140 of the third body 300 through the input member and can provide the haptic function for the input device 140 through the haptic assembly 120. The first body 100 can further be arranged at the third body 300.

In some embodiments, a structure of the third body 300 is not limited. For example, the third body 300 can have a plate-shaped structure. For example, the third body 300 can be a tablet computer, a cellphone, or a laptop computer.

In some embodiments, the apparatus further includes at least one of the second body 200, the display input assembly 150, and the display assembly 210. The second body 200 can be rotatably connected to the third body 300. The display input assembly 150 can be arranged at the third body 300. The display input assembly 150 can at least partially form the input device 140. The display assembly 210 can be arranged at the second body 200. The display assembly 210 and the display input assembly 150 can have a separate structure or an integrated structure.

In some embodiments, the input device 140, the second body 200, the display input assembly 150, and the display assembly 210 are described above, which are not repeated here.

In some embodiments, the first body 100 can include a fourth connector. The fourth connector and the first connector 131 can be configured to fix the haptic assembly 120 in the unfolded posture at the input surface of the input device 140. The fourth connector can be connected to the first connector 131 to cause the haptic assembly 120 to be stored in the first body 100. The first connector 131 can be configured to cause the haptic assembly 120 in the unfolded posture to be fixed at the input surface of the input device 140 through the fourth connector and cause the haptic assembly 120 to be stored stably in the first accommodation chamber by being connected to the fourth connector.

In some embodiments, a structure of the fourth connector is not limited, as long as the fourth connector can be connected to the first connector 131. For example, the first connector 131 can include the first adsorption member, and the fourth connector can include a fourth adsorption member. The first adsorption member and the fourth adsorption member can be connected by a magnetic adsorption force. For another example, the first connector 131 can include the first hook, and the fourth connector can include a fourth slot. The first hook can be locked in the fourth slot.

In some embodiments, a manner in which the fourth connector and the first connector 131 are configured to fix the haptic assembly 120 in the unfolded posture at the input surface of the input device 140 is not limited. For example, a fifth connector and a sixth connector can be arranged at two sides of the input device 140. The fifth connector can be configured to be connected to the fourth connector. The sixth connector can be configured to be connected to the first connector 131.

For example, the first connector 131 can include the first adsorption member, the fourth connector can include the fourth adsorption member, the fifth connector can include a fifth adsorption member, and the sixth connector can include a sixth adsorption member. The first adsorption member can be connected to the fourth adsorption member and the sixth adsorption member by a magnetic adsorption force. The fourth adsorption member can be connected to the first adsorption member and the fifth adsorption member by a magnetic adsorption force.

For another example, the first connector 131 can include the first hook, the fourth connector can include the fourth slot, the sixth connector can include a sixth slot, and the fifth connector can include a fifth hook. The first hook can be locked in the fourth slot and the sixth slot. The fifth hook can be locked in the fourth slot.

In some embodiments, when the apparatus includes the third body 300, the fifth connector and the sixth connector can be arranged at the third body 300.

The apparatus of embodiments of the present disclosure can include the function assembly, the haptic assembly 120, and a first connector 131. The function assembly can be configured to provide the first function. The haptic assembly 120 can be configured to provide the second function and have the folded posture and the unfolded posture. The first connector 131 can be arranged on the first end of the haptic assembly 120 and configured to cause the haptic assembly 120 in the unfolded posture to be fixed at the input surface of the input device 140. The second function can be different from the first function. The second function can be the haptic function. The apparatus can have the first function through the function assembly. The apparatus can have the second function through the haptic assembly 120. Thus, the apparatus can have the first function and the second function, which greatly improves the adaptability of the apparatus.

The above are only specific embodiments of the present disclosure. However, the scope of the present disclosure is not limited to this. Those skilled in the art can easily think of changes or replacements within the technical scope of the present disclosure. These changes and replacements are within the scope of the present disclosure. Therefore, the scope of the present invention should be determined by the scope of the claims.

What is claimed is:

1. An electronic apparatus comprising:
a first body;
a second body rotatably connected to the first body;
a display input assembly disposed at the first body and including a touch screen that provides a first display and an input device having an input surface;
a display assembly disposed at the second body and providing a second display;
a haptic assembly configured to provide a haptic function and having a folded posture and an unfolded posture;
a first accommodation chamber in the first body;
a first opening at a first side of the first body;
a first connector at a first end of the haptic assembly; and
a second connector at a second side of the first body, the second side and the first side being on opposite sides of the input device,
wherein:
in the folded posture, at least a part of the haptic assembly is stored in the first accommodation chamber;
the first opening is configured for the haptic assembly located in the first accommodation chamber to move out of the first accommodation chamber through the first opening;
in the unfolded posture, at least a part of the haptic assembly is located outside of the first body and is fixed on the input surface by the first connector being connected to the second connector, the haptic assembly including a plurality of protrusions configured to provide haptic positioning; and the haptic assembly is not capable of generating an input signal, and the input device is configured to collect an input operation and generate the input signal.

2. The electronic apparatus of claim 1, wherein the first connector comprises a first adsorption member and the second connector comprises a second adsorption member that are connected by an adsorption force to fix the haptic assembly on the input surface.

3. The electronic apparatus of claim 2, wherein the adsorption force is a magnetic adsorption force.

4. The electronic apparatus of claim 2, wherein the adsorption force is a vacuum adsorption force.

5. The electronic apparatus of claim 1, wherein the first connector comprises a hook and the second connector comprises a slot that receives the hook to fix the haptic assembly on the input surface.

6. The electronic apparatus of claim 1, further comprising a third connector on the first side of the first body and configured to be connected to the first connector to retain the haptic assembly in the first accommodation chamber in the folded posture.

7. The electronic apparatus of claim 1, further comprising a reset assembly connected to a second end of the haptic assembly and configured to retract the haptic assembly toward the first accommodation chamber when the first connector is disconnected from the second connector.

8. The electronic apparatus of claim 7, wherein the reset assembly comprises a spring having a first end connected to the first body and a second end connected to the second end of the haptic assembly.

9. The electronic apparatus of claim 1, wherein the haptic assembly, in the unfolded posture, has a plate-shaped sheet that overlays at least a portion of the input surface.

10. The electronic apparatus of claim 9, wherein the plate-shaped sheet comprises a rubber film.

11. The electronic apparatus of claim 1, wherein at least a portion of the haptic assembly is deformable such that the portion moves in a direction substantially perpendicular to the input surface in response to an external force and returns toward an original position upon removal of the external force.

12. The electronic apparatus of claim 1, wherein at least one of the plurality of protrusions is non-deformable and provides a haptic positioning cue.

13. The electronic apparatus of claim 1, wherein the haptic assembly comprises a first haptic region having first protrusions marked with letters and a neighboring second haptic region having second protrusions marked with numbers.

14. The electronic apparatus of claim 13, wherein the first haptic region has a width greater than a width of the second haptic region.

15. The electronic apparatus of claim 1, wherein the first body further comprises a second opening at the second side, and the haptic assembly comprises a first haptic member movable through the first opening and a second haptic member movable through the second opening to become adjacent to each other on the input surface.

16. The electronic apparatus of claim 1, wherein the first body further comprises a second opening at the second side, and the haptic assembly comprises a single structural member having a first part movable through the first opening and a second part movable through the second opening.

17. The electronic apparatus of claim 1, further comprising an input member, wherein the input device is configured to detect a position of the input member relative to the input surface when a distance relationship between the input member and the input device is satisfied.

18. The electronic apparatus of claim 17, wherein the input member comprises a stylus.

* * * * *